US005844640A

United States Patent [19]
Adachi

[11] Patent Number: 5,844,640
[45] Date of Patent: Dec. 1, 1998

[54] DRIVING METHOD OF LIQUID CRYSTAL DISPLAY DEVICE WHEREIN ELECTRIC FIELD GENERATED BY SUPPLYING ORIENTATION CONTROL SIGNALS TO SIGNAL LINES

[75] Inventor: Masahiro Adachi, Nara, Japan

[73] Assignee: Sharp Kabushiki Kaisha, Osaka, Japan

[21] Appl. No.: 807,029

[22] Filed: Feb. 26, 1997

[30] Foreign Application Priority Data

Feb. 26, 1996 [JP] Japan .................................... 8-038516

[51] Int. Cl.[6] ............................ G02F 1/133; G09G 3/36; G09G 5/22

[52] U.S. Cl. ............................... 349/33; 345/94; 345/141

[58] Field of Search ................................ 349/33; 345/94, 345/95, 96, 97, 141

[56] References Cited

U.S. PATENT DOCUMENTS

| | | | |
|---|---|---|---|
| 5,105,288 | 4/1992 | Senda et al. | 345/94 |
| 5,117,298 | 5/1992 | Hirai | 345/96 |
| 5,159,476 | 10/1992 | Hayashi | 359/54 |
| 5,247,376 | 9/1993 | Wakai | 345/94 |
| 5,264,953 | 11/1993 | Hirai et al. | 349/33 |
| 5,416,619 | 5/1995 | Koike | 349/143 |
| 5,587,722 | 12/1996 | Suzuki et al. | 345/94 |
| 5,617,229 | 4/1997 | Yamamoto et al. | 349/42 |
| 5,663,077 | 9/1997 | Adachi et al. | 438/151 |

FOREIGN PATENT DOCUMENTS 6-230 426 8/1994 Japan .

*Primary Examiner*—William L. Sikes
*Assistant Examiner*—Tarifur R. Chowdhury
*Attorney, Agent, or Firm*—David G. Conlin; George W. Neuner

[57] ABSTRACT

A driving method of a liquid crystal display apparatus including an active matrix substrate, a counter substrate opposed to the active matrix substrate and a liquid crystal layer interposed between the active matrix substrate and the counter substrate, wherein the active matrix substrate includes a plurality of pixel electrodes formed in rows and columns; a plurality of switching devices respectively connected to the pixel electrodes; a plurality of source lines arranged along the rows of the pixel electrodes; and a plurality of signal lines respectively arranged along the columns of the pixel electrodes, includes the step of generating an electric field between each of the pixel electrodes and the associated signal line to form a plurality of liquid crystal regions having different orientations of liquid crystal molecules within a region corresponding to the pixel electrodes.

5 Claims, 2 Drawing Sheets

DRIVING METHOD OF LIQUID CRYSTAL DISPLAY DEVICE WHEREIN ELECTRIC FIELD GENERATED BY SUPPLYING ORIENTATION CONTROL SIGNALS TO SIGNAL LINES

BACKGROUND OF THE INVENTION

1. Field of the Invention

The present invention relates to a liquid crystal display device using thin film transistors (hereinafter, referred to as TFTs) and a method for driving the same. In particular, the present invention relates to a liquid crystal display device capable of controlling the viewing angle and a method for driving the same.

2. Description of the Related Art

A known liquid crystal display device includes a pair of substrates disposed to face each other with respective electrodes formed on the inner sides thereof and a liquid crystal layer interposed between the substrates. A voltage is applied between the electrodes to change the orientation of liquid crystal molecules and thus change the refractive index of the liquid crystal layer, thereby to effect display.

A simple matrix method is one of the methods used for driving such a liquid crystal display device at the lowest cost. With the recent progress in multi-media information communication, however, display devices are increasingly required to have higher resolution, higher contrast, higher gradation (which is required for realizing a full color display or a multi-color display), and a broader viewing angle. The simple matrix driving method can not satisfy such requirements. An active matrix method has been proposed to satisfy such requirements, where switching elements such as TFTs are provided for respective pixels to increase the number of operable gate lines. By employing the active matrix driving method, display devices with higher resolution, higher contrast, higher gradation, and a broader viewing angle have been achieved as compared with the display devices driven by the simple matrix driving method.

Twisted nematic (TN) liquid crystal material is conventionally used for a liquid crystal display device employing the active matrix method. In such a TN liquid crystal display device, liquid crystal molecules have refractive index anisotropy and are pre-tilted with respect to a substrate of the device. Therefore, the light transmittance of the liquid crystal layer varies depending on the angle at which the observer views the liquid crystal display device (viewing angle). Thus, the contrast of an image displayed varies depending on the viewing angle. The resultant liquid crystal display device has a large viewing angle dependency.

A technique for improving the viewing angle dependency to obtain a broad viewing angle is known. In this technique, a plurality of regions having orientations of liquid crystal molecules different from one another are formed within one pixel to average the viewing angle dependency of the light transmittance of the TN liquid crystal display device. For example, Japanese Laid-Open Patent Publication No. 6-230426 discloses a technique where an electrode for controlling the orientation of liquid crystal molecules is formed in the vicinity of a pixel electrode. A voltage is applied to the electrode for controlling the orientations of liquid crystal molecules to generate an electric field in a lateral direction with respect to the pixel electrode, so that a plurality of regions having different orientations of liquid crystal molecules which are uniform in respective regions but different from one another are formed within one pixel.

The above technique disclosed in Japanese Laid-Open Patent Publication No. 6-230426 provides a liquid crystal display device with a broad viewing angle by forming a plurality of regions having different orientations of liquid crystal molecules which are uniform in respective areas but different from one another. This technique, however, requires to additionally form the electrodes for controlling the orientations of liquid crystal molecules. By forming additional electrodes, the effective display region of the liquid crystal display device is reduced and the screen darkens. Since the number of the electrodes for controlling the orientations of liquid crystal molecules required is as large as the number of gate lines or data lines, the total number of wirings increases. This increases the probability of defect occurrence during the fabrication of the device, and thus increases fabrication cost.

SUMMARY OF THE INVENTION

According to one aspect of the present invention, a driving method of a liquid crystal display apparatus is provided. The liquid crystal display apparatus includes an active matrix substrate, a counter substrate opposed to the active matrix substrate and a liquid crystal layer interposed between the active matrix substrate and the counter substrate, wherein the active matrix substrate includes a plurality of pixel electrodes formed in rows and columns; a plurality of switching devices respectively connected to the pixel electrodes; a plurality of source lines arranged along the rows of the pixel electrodes; and a plurality of signal lines respectively arranged along the columns of the pixel electrodes. The driving method includes the step of generating an electric field between each of the pixel electrodes and the associated signal line to form a plurality of liquid crystal regions having different orientations of liquid crystal molecules within a region corresponding to the pixel electrode.

In one embodiment of the present invention, the driving method further includes the steps of supplying scan signals to the scan lines to sequentially select one of the scan lines, and supplying image signals to the signal lines, respectively, wherein each of the scan signals includes a selection period in which one of the corresponding scanning lines is selected and a non-selection period, wherein the image signals are supplied to the signal lines in a portion of the selection period including an end of the selection period, and wherein the step of generating the electric field includes the step of supplying orientation control signals to the signal lines in a further portion prior to the portion in which the image signals are supplied.

The orientation control signals may have levels adjusted in accordance with areas of the liquid crystal regions to be formed.

According to another aspect of the present invention, a liquid crystal display apparatus driven by the above-described driving method is provided. In the liquid crystal display apparatus, the switching devices include thin film transistors in which channel regions are formed of polycrystalline silicon. Alternatively, each of the switching devices includes a thin film transistor which includes a channel region formed of amorphous silicon and a ratio of a channel width to a channel length is 2 or more.

Thus, according to the present invention, a plurality of areas having different orientations of liquid crystal molecules which are uniform in respective areas but different from one another are formed within one pixel by generating an electric field between the signal line and the pixel electrode. This eliminates the necessity of additionally forming an electrode for controlling the orientation of liquid crystal. An image signal is output during the second half of a selection period as a signal to be input into a signal line in synchronization with a scanning signal to be input into a scanning line, while a orientation control signal is output during the first half of the selection period. The orientation control signal causes an electric field to be generated between the signal line and the pixel electrode, The write time when the image signal is written in the pixel electrode can be shortened by using polycrystalline silicon for a semiconductor layer constituting a channel of a thin film transistor. The write time can also be shortened by using amorphous silicon and securing a large ratio of channel width/channel length of the transistor, for example, a ratio of 2 or more. In this way, high-speed write operation is ensured during the latter half of the selection period even if the orientation control signal is allocated in the first half of the selection period.

The size of the regions where liquid crystal molecules are oriented in different directions formed within one pixel can be increased or decreased by varying the voltage level of the orientation control signal. Also, the regions where liquid crystal molecules are oriented in different directions may be generated or extinguished within one pixel to control the viewing angle.

Thus, the intention described herein makes possible the advantages of (1) providing a liquid crystal display device which has a broad viewing angle and displays a bright image without complicating the structure, and (2) providing a method for fabricating such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of example with reference to the accompanying drawings.

Figure 1:
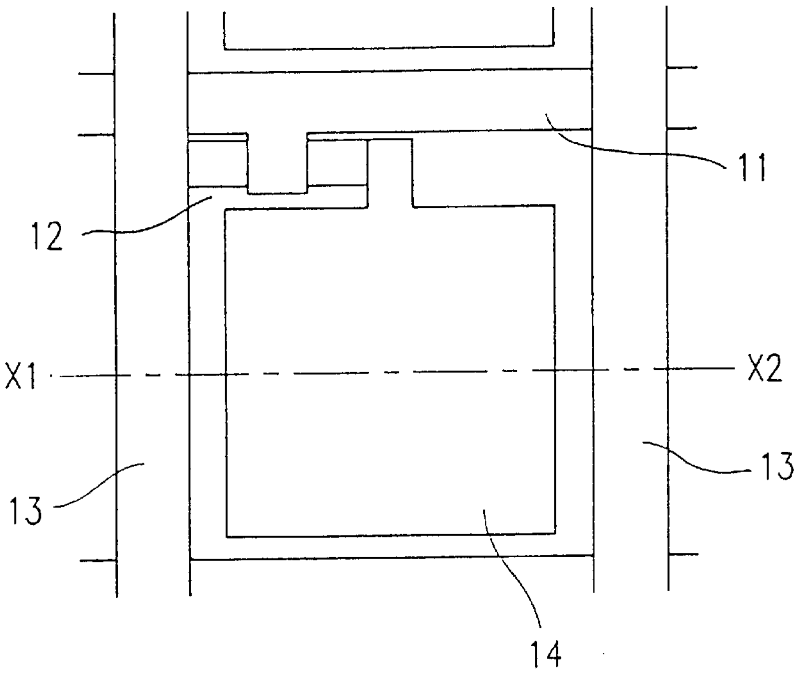
FIG. 1 is a plan view showing an active matrix substrate of a liquid crystal display device according to the present invention.
Figure 2:
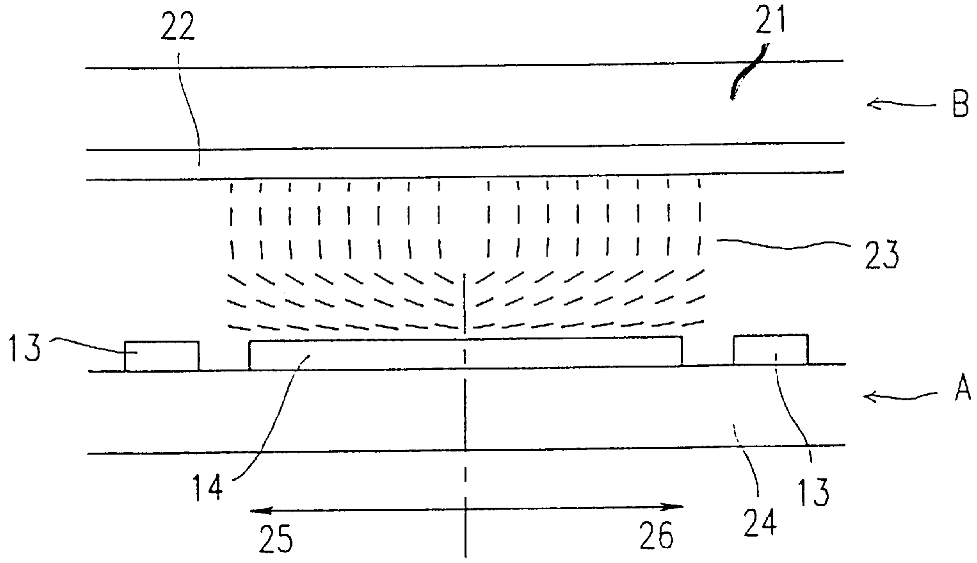
FIG. 2 is a sectional view of the liquid crystal display device, taken along line X1–X2 of FIG. 1.

FIG. 1 is a plan view showing an active matrix substrate of one embodiment of the liquid crystal display device according to the present invention. FIG. 2 is a sectional view of the liquid crystal display device, taken along line X1–X2 of FIG. 1.

Referring to FIGS. 1 and 2, the liquid crystal display device includes an active matrix substrate A and a counter substrate B disposed to face each other with a liquid crystal layer 23 interposed therebetween. The active matrix substrate A includes pixel electrodes 14 and TFTs 12 both arranged in a matrix on an insulating substrate 24. Gate lines 11 and data lines 13 run crossing each other along the pixel electrodes 14 on the insulating substrate 24. The gate lines 11 serve as scanning lines for supplying scanning signals to turn on/off the TFTs 12. The data lines 13 serve as signal lines for supplying image signals to the pixel electrodes 14 via the TFTs 12. The counter substrate B Includes a counter electrode 22 formed on an insulating substrate 21. The substrates A and B are disposed to face each other so that the surfaces thereof where the electrodes 14 and 22 are formed are located inside. A liquid crystal layer 23 is formed by filling a gap between the substrates A and B with liquid crystal material. In this example, TN liquid crystal material is used for the liquid crystal layer 23. Alignment films (not shown) are formed on the substrates A and B so as to be in contact with the liquid crystal layer 23. The alignment films are used for making the orientations of liquid crystal molecules uniform.

Figure 3A:
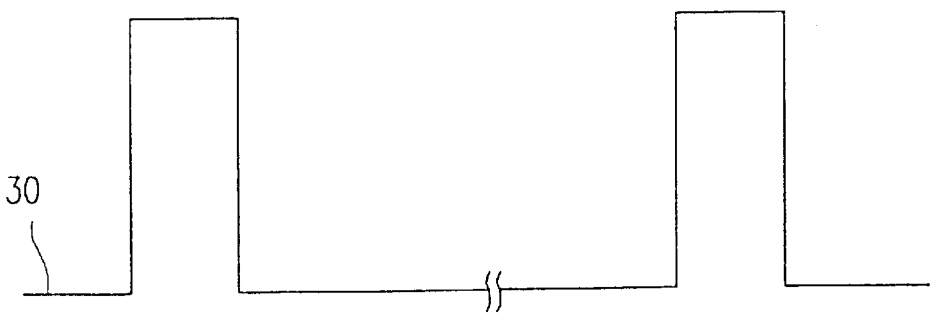
FIGS. 3A to 3C are views showing a method for driving a liquid crystal display device according to the present invention.

In the liquid crystal display device with the above structure, scanning signals and image signals are respectively supplied to the gate lines 11 end the data lines 13. When the scanning signal supplied to each gate line 11 becomes ON, the corresponding TFT 12 is turned on, allowing the image signal from the corresponding data line 13 to be input into the corresponding pixel electrodes 14 via the TFTs 12. At this time, angles at which the liquid crystal molecules of the liquid crystal layer 23 are tilted with respect to the substrate are changed depending on the effective voltage generated between the counter electrode 22 and the pixel electrodes 14. The light (polarized light in most cases) transmittance of the liquid crystal layer 23 varies depending on the tilted angles of the liquid crystal molecules. Thus, gradation display is effected FIGS. 3A to 3C show signals output from a driving circuit of the liquid crystal display device.

Figure 3B:
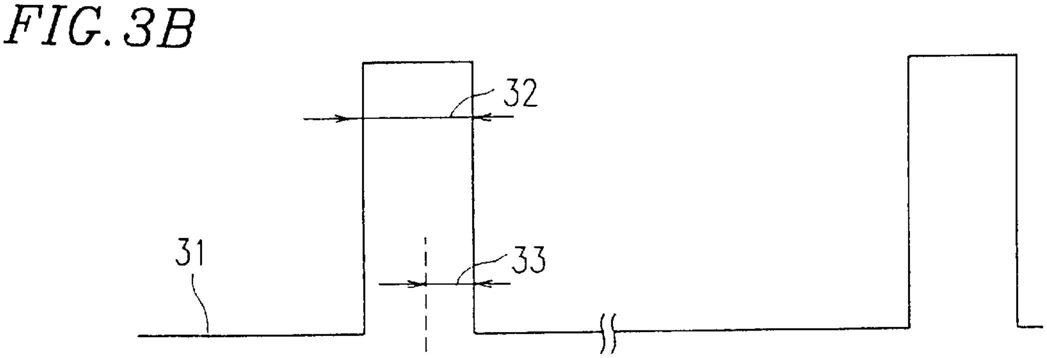

FIG. 3B shows a scanning signal 31 having a selection period 32 of several tens of microseconds and a non-selection period, which is input to one of the gate lines 11. In a selection period 32, the corresponding gate line is selected. According to the present invention, in a latter half portion 33 (several milliseconds) of the selection period 32, a write period including a write margin of several microseconds is provided for writing the image signals into the pixel electrodes 14 associated with the corresponding gate line 11, so as to include an ending timing of the selection period 32 (timing at which a selection period is switched to a non-selection period). FIG. 3A shows a scanning signal 30 which is input into a gate line located immediately before the gate line into which the scanning signal 31 is input.

Figure 3C:
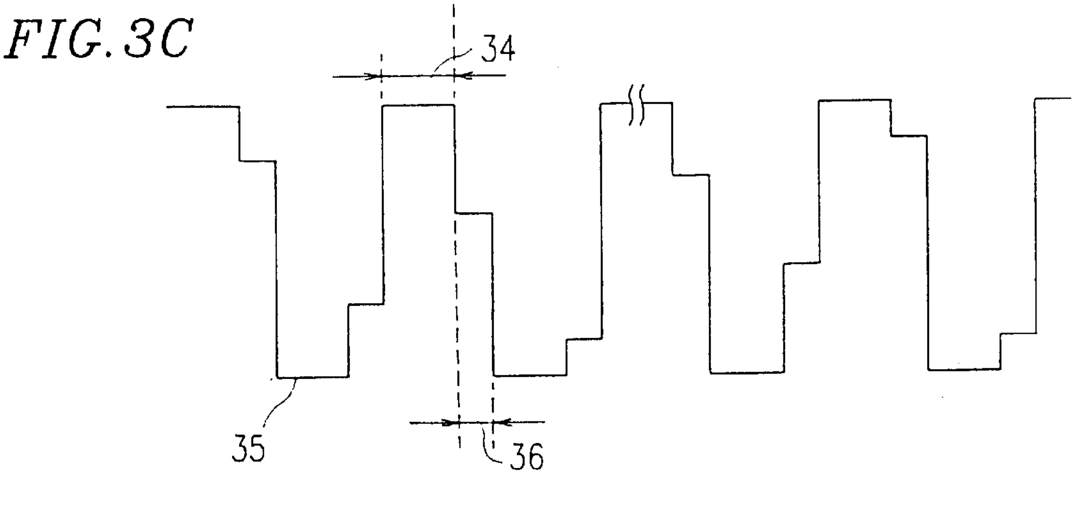

FIG. 3C shows an image signal 35 to be input into the data line. The signal 35 has an image signal input period 36 corresponding to the latter portion 33 of the selection period 32 of the scanning signal 31, and a liquid crystal orientation control signal input period 34 corresponding to a portion before the latter portion 33.

The liquid crystal display device is driven by this driving circuit in the following manner.

In the liquid crystal orientation control signal input period 34, orientation control signals are supplied to the data lines 13. When the orientation control signal is input into one data line 13, an electric field is generated between the data line 13 and the corresponding pixel electrodes 14. The electric field causes the liquid crystal molecules located closer to the data line 13 (the liquid crystal molecules in a region 25 in FIG. 2) to be tilted in a different manner from those which are tilted at the pretilt angles by the interaction with the alignment film (the liquid crystal molecules in a region 26 in FIG. 2). In other words, tilt directions in which the liquid crystal molecules are tilted with respect to the substrate are different between the regions 25 and 26. Thus, the orientation of the liquid crystal molecules located closer to the data line 13 is made different from that of the other liquid crystal molecules which are not affected substantially by the electric field between the data line 13 and the pixel electrode 14 but affected by the alignment film, thereby forming two regions 25 and 26 having orientations which are uniform in the respective regions but different from each other within a region corresponding to one of the pixel electrodes 14.

In the image signal input period 36, when an image signal is input into the pixel electrode 14, the tilt angles of the liquid crystal molecules are controlled with an electric field generated between the pixel electrode 14 at a potential of the input image signal and the counter electrode 22 into which a predetermined voltage is applied. The tilt directions of the liquid crystal molecules in the regions 25 and 26 are different from each other as described above, and are maintained during application of the image signal. Therefore, the regions 25 and 26, in which the liquid crystal molecules are tilted in different directions and thus orientations thereof are different, are maintained after the input of the image signal. As a result, broad viewing angle characteristics can be obtained.

As described above, according to the present invention, the broad viewing angle characteristics can be obtained without changing the structure of the liquid crystal display device. The voltage level of the orientation control signals may be a value within the range where the orientations (in particular, the tilt directions) of liquid crystal molecules can be controlled, but preferably has an amplitude as large as the largest amplitude of the image signal. With this voltage level, the potential difference between the data line and the pixel electrode is suppressed from varying depending on the image signal written in the pixel.

Polysilicon is preferably used for a semiconductor layer (not shown) constituting a channel region of the TFT 12. This shortens the write time for writing the image signal in the pixel electrode 14 to several microseconds. Alternatively, amorphous silicon may be used for the semiconductor layer of the TFT 12. In this case, the ratio of channel width/channel length should be as large as, for example, 2 or more, preferably about 5. With this setting, high-speed write operation as in the case of using polycrystalline silicon (polysilicon) is possible. As a result, the pixel electrode 14 can be charged with the image signal at high speed during a shortened time of the selection period allocated to one gate line, while the remaining time of the selection period can be used for the input of the orientation control signal.

Further, the voltage level of the orientation control signal may be adjusted in accordance with desired areas of the regions 25 and 26 having different orientations. The voltage level of the orientation control signal may be set so that the potential difference between the data line 13 and the pixel electrode 14 is small. For example, it may be set to be equal to the intermediate level of the image signal. In this case, the orientations of liquid crystal molecules become uniform over one pixel (i.e., one pixel is composed of a single region) as is the cause in general liquid crystal display devices. Thus, the areas of the regions having different orientations can be adjusted by varying the voltage level of the orientation control signal, thereby the viewing angle characteristics can be adjusted.

Thus, according to the present invention, a plurality of regions having different orientations of liquid crystal molecules which are uniform in respective regions but different from one another can be formed within one pixel by generating an electric field between the signal line and the pixel electrode. This allows for a liquid crystal display with broad viewing angle characteristics. Also, according to the present invention, no electrode for controlling the orientation of liquid crystal molecules is additionally required. This allows for a bright display without complicating the fabrication process. Polysilicon is preferably used for the semiconductor layer constituting the channel of the TFT to charge the pixel electrode with the image signal at high speed to ensure the input of the orientation control signal. If amorphous silicon is used for the semiconductor layer, the ratio of channel width/channel length is preferably 2 or more.

Moreover, the size of the regions having different orientations of liquid crystal molecules which are uniform in respective regions but different from one another formed within one pixel can be increased or decreased by varying the voltage level of the orientation control signal. Also, the regions having different orientations of liquid crystal molecules which are uniform in respective regions but different from one another may be generated or extinguished to control the viewing angle.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A driving method of a liquid crystal display apparatus including an active matrix substrate, a counter substrate opposed to the active matrix substrate and a liquid crystal layer interposed between the active matrix substrate and the counter substrate, wherein the active matrix substrate includes a plurality of pixel electrodes formed in rows and columns; a plurality of switching devices respectively connected to the pixel electrodes, a plurality of scan lines arranged along the rows of the pixel electrodes; and a plurality of signal lines respectively arranged along the columns of the pixel electrodes, the method comprising the steps of:

generating an electric field between each of the pixel electrodes and the associated signal line to form a plurality of liquid crystal regions having different orientations of liquid crystal molecules within a regions corresponding to the pixel electrode;

supplying scan signals to the scan lines to sequentially select one of the scan lines; and supplying image signals to the signal lines, respectively, wherein each of the scan signals includes a selection period during which one of the corresponding scanning lines is selected and a non-selection period, wherein the image signals are supplied to the signal lines during the selection period including an end of the selection period, and wherein the step of generating the electric field includes the step of supplying orientation control signals, as a part of the image signals, to the signal lines during an additional portion of the selection period prior to a portion of the selection period corresponding to an image signal input period during which the image signals are supplied.

2. A driving method of a liquid crystal display apparatus according to claim 1, wherein in orientation control signals have levels adjusted in accordance with areas of the liquid crystal regions to be formed.

3. A liquid crystal display apparatus driven by the driving method of claim 1, wherein the switching devices comprise thin film transistors in which channel regions are formed of polycrystalline silicon.

4. A liquid crystal display apparatus driven by the driving method of claim 1, wherein each of the switching devices comprises a thin film transistor which includes a channel region formed of amorphous silicon and a ratio of a channel width to a channel length is 2 or more.

5. A driving method of a liquid crystal display apparatus according to claim 1, wherein a voltage level of the orientation control signals has an amplitude as large as the largest amplitude of the image signal.

* * * * *